United States Patent [19]

Oswald et al.

[11] Patent Number: 4,581,209
[45] Date of Patent: Apr. 8, 1986

[54] N-AMINOALKYL ALKYLPIPERAZINE PROMOTED ACID GAS SCRUBBING PROCESS

[75] Inventors: Alexis A. Oswald, Mountainside; Guido Sartori, Linden; David W. Savage, Summit; Warren A. Thaler, Aberdeen, all of N.J.

[73] Assignee: Exxon Research and Engineering Co., Florham Park, N.J.

[21] Appl. No.: 538,189

[22] Filed: Oct. 3, 1983

[30] Foreign Application Priority Data

Oct. 27, 1982 [GB] United Kingdom ............... 8230653

[51] Int. Cl.[4] .................. B01D 53/34; C09K 3/00
[52] U.S. Cl. ................................ 423/223; 252/192; 423/228; 423/232; 423/234
[58] Field of Search ............ 423/223, 226, 228, 229, 423/232, 234; 252/189, 192; 544/402

[56] References Cited

U.S. PATENT DOCUMENTS

| | | | |
|---|---|---|---|
| 2,965,609 | 12/1960 | Newey | 260/47 |
| 3,526,661 | 9/1970 | Hu | 260/558 |
| 3,925,389 | 12/1975 | Yeakey et al. | 260/268 SY |
| 4,049,657 | 9/1977 | Brennan et al. | 544/402 |
| 4,094,957 | 6/1978 | Sartori et al. | 423/223 |

FOREIGN PATENT DOCUMENTS

| | | |
|---|---|---|
| 0008449 | 5/1980 | European Pat. Off. |
| 45-3223 | 2/1970 | Japan |

*Primary Examiner*—John Doll
*Assistant Examiner*—Jeffrey E. Russel
*Attorney, Agent, or Firm*—Janet Hasak; Henry E. Naylor

[57] ABSTRACT

The present invention relates to an alkaline salt promoter system which includes an N-aminoalkyl alkylpiperazine, preferably the compound 1-(3-aminopropyl)-2,5-dimethylpiperazine (APDP), an alkali metal salt or hydroxide (e.g., $K_2CO_3$) and water. These scrubbing compositions may be used for removing $CO_2$ from gaseous streams containing $CO_2$.

18 Claims, No Drawings

N-AMINOALKYL ALKYLPIPERAZINE PROMOTED ACID GAS SCRUBBING PROCESS

BACKGROUND OF THE INVENTION

The present invention relates to the use of certain N-aminoalkyl alkylpiperazines, especially 1-(3-aminopropyl)-2,5-dimethylpiperazine (APDP), as promoters for alkaline salts in "hot pot" type acid gas scrubbing processes.

Recently, it was shown in U.S. Pat. No. 4,112,050 that sterically hindered amines are superior to diethanolamine (DEA) as promoters for alkaline salts in the "hot pot" acid gas scrubbing process. U.S. Pat. No. 4,094,957 describes an improvement to this process whereby amino acids, especially sterically hindered amino acids, serve to prevent phase separation of the aqueous solution containing sterically hindered amines at high temperatures and low fractional conversions during the acid gas scrubbing process.

One of the preferred sterically hindered amines described in these patents is N-cyclohexyl-1,3-propanediamine. The bulky cyclohexane ring on this diamino compound provides steric hindrance to the carbamate formed at this site thereby favoring the expulsion of $CO_2$ during regeneration, thereby leaving the hindered amine group free to protonate. The primary amino group of this diamino compound assists in maintaining solubility under lean conditions. Under lean conditions when there is insufficient carbonic acid present to protonate the hindered amino group, the molecule would be insoluble were it not for the primary amino group which forms a stable polar carbamate ion. However, even the carbamated primary amino group is insufficient to prevent insolubility of the compound under very lean conditions and an additional additive, as proposed in U.S. Pat. No. 4,094,957, an amino acid, is required to maintain solubility of the diamino compound. This amino acid also contributes to additional capacity and faster absorption rates for carbon dioxide, so it therefore acts as a copromoter in addition to solubilizing the sterically hindered diamino compound. Screening studies of available amino acids as possible copromoters for N-cyclohexyl 1,3-propanediamine based on cyclic capacity and rates of absorption ascertained that pipecolinic acid was one of the best amino acid copromoters.

Subsequent studies, however, have demonstrated that the N-cyclohexyl-1,3-propanediamine/pipecolinic acid promoter system has several shortcomings. First, N-cyclohexyl-1,3-propanediamine is both chemically unstable and volatile. For example, it degrades into a cyclic urea, especially in the presence of hydrogen sulfide. In fact, the rate of cyclic urea formation has been found to be highly dependent on hydrogen sulfide concentration, a common contaminant of industrial acid gas streams. The cyclic urea formation from this diamine is favored by the stability of the six-membered ring structure of the cyclic urea. In addition to promoter losses due to cyclic urea formation, which may be a serious problem with hydrogen sulfide rich streams, the cyclic urea product has limited solubility, and its separation from solution poses additional problems. Various techniques for coping with this water insoluble cyclic urea have been proposed. See, for example, U.S. Pat. Nos. 4,180,548 and 4,183,903. However, these techniques have specific benefits and problems, e.g., specialized equipment is necessary.

Pipecolinic acid also has shortcomings, e.g., it is rather expensive and its picoline precursor is in limited supply.

In view of the commercial potential of using the sterically hindered amino compounds as described and claimed in U.S. Pat. Nos. 4,094,957 and 4,112,050, there is a need for finding sterically hindered amino compounds which perform as well as N-cyclohexyl-1,3-propanediamine but do not have the volatility and degradation problems of this compound.

Also, U.S. Pat. Nos. 4,094,957 and 4,112,050 disclose various other sterically hindered amines, including specific piperazine compounds. These specifically identified piperazines have been found to be too volatile for economic utilization on large scale acid gas treating facilities. Also, there is a need for finding a less costly replacement for pipecolinic acid which possesses its effectiveness. Preferably, there is a need for finding a single amino compound which performs as well or nearly as well as the N-cyclohexyl-1,3-propanediamine/pipecolinic acid mixture, but does not suffer the preparative cost, volatility and degradation problems of this mixture. Such a discovery would be of significant technical and economic merit.

Various amino acids have been proposed as promoters for alkaline salts in the "hot pot" gas scrubbing process. For example, British Pat. No. 1,305,718 describes the use of beta and gamma amino acids as promoters for alkaline salts in the "hot pot" acid gas treating process. These amino acids, however, are not suitable because the beta-amino acids undergo deamination when heated in aqueous potassium carbonate solutions. The gamma amino acids form insoluble lactams under the same conditions. Also, the alphaamino acid, N-cyclohexyl glycine, as described in Belgian Pat. No. 767,105, forms an insoluble diketopiperazine when heated in aqueous solutions containing potassium carbonate.

SUMMARY OF THE INVENTION

It has now been discovered that certain sterically hindered triamino compounds, namely N-aminoalkyl alkylpiperazines, especially 1-(3-aminopropyl)-2,5-dimethylpiperazine (APDP) are excellent promoters for alkaline salts in the "hot pot" acid gas scrubbing process. These amino compounds, when used as promoters, not only provide for high carbon dioxide capacity and high rates of carbon dioxide absorption, but do not form undesirable insoluble degradation products as in the case of N-cyclohexyl-1,3-propanediamine, the beta and gamma amino acids and the alpha amino acid, N-cyclohexyl glycine. Also, these amino compounds are less volatile than N-cyclohexyl-1,3-propanediamine and the piperazines disclosed in U.S. Pat. Nos. 4,094,957 and 4,112,050; thereby the economy of these promoters is greater than that of the previously employed promoters.

Accordingly, in one embodiment of the present invention, there is provided a process for the removal of $CO_2$ from a gaseous stream containing $CO_2$ which comprises contacting said gaseous stream (1) in an absorption step with an aqueous absorbing solution comprising (a) a basic alkali metal salt or hydroxide selected from alkali metal bicarbonates, carbonates, hydroxides, borates, phosphates and their mixtures, and (b) an activator or promoter system for said basic alkali metal salt or hydroxide comprising at least an effective amount of N-aminoalkyl alkylpiperazine; and (2) in a desorption and regeneration step, desorbing at least a portion of the absorbed $CO_2$ from said absorbing solution.

As another embodiment of the present invention, there is provided an acid gas scrubbing composition comprising: (a) 10 to about 40% by weight of an alkali metal salt or hydroxide, (b) 2 to about 20% by weight of an N-aminoalkyl alkylpiperazine and (c) the balance, water.

Still another embodiment of the invention comprises the novel N-aminoalkyl alkyl piperazines, 1-(3-aminopropyl)-2,5-dimethylpiperazine (APDP) and 3-(3-methyl-1-piperazino)-butylamine.

The N-aminoalkyl alkylpiperazines promoter may be admixed with certain amino acids as copromoters, preferably an amino acid containing 4 to 8 carbon atoms. The amino acid will preferably comprise a sterically hindered amino acid. Especially preferred amino acids include N-secondary butylglycine, N-isopropyl glycine, N-isopropyl alanine, N-sec. butyl alanine, N-n-butyl glycine and pipecolinic acid.

DESCRIPTION OF THE PREFERRED EMBODIMENTS

The N-aminoalkyl alkylpiperazines useful as promoters in the practice of the present invention include those represented by the formulae:

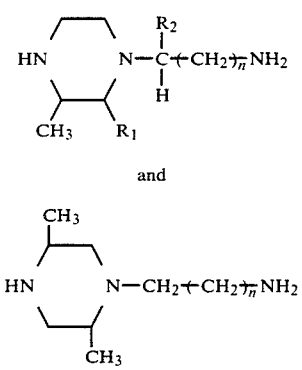

and $$\text{(II)}\quad \underset{CH_3}{\overset{CH_3}{\diagup}}\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!$$

where $R_1$ is hydrogen or a lower alkyl radical (e.g. $C_1$–$C_6$ alkyl), preferably a methyl radical, $R_2$ is hydrogen or a lower alkyl radical (e.g. $C_1$–$C_6$ alkyl), preferably a methyl radical, and n is 1–3, preferably 2. The most preferred aminoalkyl piperazine is 1-(3-aminopropyl)-2,5-dimethylpiperazine (APDP).

Also, disclosed is the method for preparing these N-aminoalkyl alkyl piperazines.

The triamino piperazines of formula I may be prepared by (1) cyanomethylation or cyanoethylation of a piperazine, followed by hydrogenation of the cyanoalkyl piperazine or (2) reductive condensation of 2,3-butane-dione with a triamine (method 2 is used only when $R_1$ is methyl and $R_2$ is hydrogen). By a procedure similar to method 2 it is possible to obtain 2,3-dimethyl-piperazine in one step, via reductive condensation of 2,3-butanedione with ethylenediamine. This is a new method to make 2,3-dimethylpiperazine, which so far was made either by hydrogenation of the corresponding 5,6-dihydropyrazine or by condensation of ethylenediamine with 2,3-butanediol. The compounds of formula II can be prepared by reductive condensation of isopropanolamine to produce 2,5-dimethyl-piperazine followed by cyanoalkylation and reduction.

In general, the aqueous scrubbing solution will comprise an alkaline material comprising a basic alkali metal salt or alkali metal hydroxide selected from Group IA of the Periodic Table of Elements. More preferably, the aqueous scrubbing solution comprises potassium or sodium borate, carbonate, hydroxide, phosphate or bicarbonate. Most preferably, the alkaline material is potassium carbonate.

The alkaline material comprising the basic alkali metal or salt or alkali metal hydroxide may be present in the scrubbing solution in the range from about 10% to about 40% by weight, preferably from 20% to about 35% by weight. The actual amount of alkaline material chosen will be such that the alkaline material and the amino acid activator or promoter system remain in solution throughout the entire cycle of absorption of $CO_2$ from the gas stream and desorption of $CO_2$ from the solution in the regeneration step. Likewise, the amount and mole ratio of the amino acids is maintained such that they remain in solution as a single phase throughout the absorption and regeneration steps. Typically, these criteria are met by including from about 2 to about 20% by weight, preferably from 5 to 15% by weight, more preferably, 5 to 10% by weight of this sterically hindered N-aminoalkyl alkylpiperazine. Should an amino acid be included, the amino acid can be added in an amount such that the solution contains 2 to about 20% by weight, preferably 5 to about 15% by weight, and more preferably 5 to 10% by weight.

The aqueous scrubbing solution may include a variety of additives typically used in acid gas scrubbing processes, e.g., antifoaming agents, antioxidants, corrosion inhibitors and the like. The amount of these additives will typically be in the range that they are effective for the intended purpose, i.e., an effective amount.

The term acid gas includes $CO_2$ alone or in combination with $H_2S$, $CS_2$, HCN, COS and the oxides and sulfur derivatives of $C_1$ to $C_4$ hydrocarbons. These acid gases may be present in trace amounts within a gaseous mixture or in major proportions.

The contacting of the absorbent mixture and the acid gas may take place in any suitable contacting tower. In such processes, the gaseous mixture from which the acid gases are to be removed may be brought into intimate contact with the absorbing solution using conventional means, such as a tower packed with, for example, ceramic rings or with bubble cap plates or sieve plates, or a bubble reactor.

In a preferred mode of practicing the invention, the absorption step is conducted by feeding the gaseous mixture into the base of the tower while fresh absorbing solution is fed into the top. The gaseous mixture freed largely from acid gases emerges from the top. Preferably, the temperature of the absorbing solution during the absorption step is in the range from about 25° to about 200° C., and more preferably from 35° to about 150° C. Pressures may vary widely; acceptable pressures are between 5 and 2000 psia, preferably 100 to 1500 psia, and most preferably 200 to 1000 psia in the absorber. In the desorber, the pressures will range from about 5 to 100 psig. The partial pressure of the acid gas, e.g., $CO_2$ in the feed mixture will preferably be in the range from about 0.1 to about 500 psia, and more preferably in the range from about 1 to about 400 psia. The contacting takes place under conditions such that the acid gas, e.g., $CO_2$, is absorbed by the solution. Generally, the countercurrent contacting to remove the acid gas will last for a period of from 0.1 to 60 minutes, preferably 1 to 5 minutes. During absorption, the solution is maintained in a single phase. The triamino piperazine gives low foam in the contacting vessels.

The aqueous absorption solution comprising the alkaline material, the activator system comprising the sterically hindered aminoalkyl piperazine, which is saturated or partially saturated with gases such as $CO_2$ and $H_2S$, may be regenerated so that it may be recycled back to the absorber. The regeneration should also take place in a single liquid phase. Therefore, the presence of the highly water-soluble amino acid provides an advantage in this part of the overall acid gas scrubbing process. The regeneration or desorption is accomplished by conventional means, such as pressure reduction, which causes the acid gases to flash off or by passing the solution into a tower of similar construction to that used in the absorption step, at or near the top of the tower, and passing an inert gas such as air or nitrogen or preferably steam up the tower. The temperature of the solution during the regeneration step may be the same as used in the absorption step, i.e., 25° to about 200° C., and preferably 35° to about 150° C. The absorbing solution, after being cleansed of at least a portion of the acid bodies, may be recycled back to the absorbing tower. Makeup absorbent may be added as needed. The use of an amino acid cosolvent, e.g., N-secondary butyl glycine, enables one to maintain a single phase regardless of the $CO_2$ content in the acid gas.

As a typical example, during desorption, the acid gas, e.g., $CO_2$-rich solution from the high pressure absorber is sent first to a flash chamber where steam and some $CO_2$ are flashed from solution at low pressure. The amount of $CO_2$ flashed off will, in general, be about 35 to 40% of the net $CO_2$ recovered in the flash and stripper. This is increased somewhat, e.g., to 40 to 50%, with the high desorption rate promoter system owing to a closer approach to equilibrium in the flash. Solution from the flash drum is then steam stripped in the packed or plate tower, stripping steam having been generated in the reboiler in the base of the stripper. Pressure in the flash drum and stripper is usually 16 to about 100 psia, preferably 16 to about 30 psia, and the temperature is in the range from about 25° to about 200° C., preferably 35° to about 150° C., and more preferably 100° to about 140° C. Stripper and flash temperatures will, of course, depend on stripper pressure, thus at about 16 to 25 psia stripper pressures, the temperature will preferably be about 100° to about 140° C. during desorption. Single phase may be maintained and facilitated by use of an amino acid, preferably N-secondary butyl glycine as a co-promoter.

In the most preferred embodiment of the present invention, the acid gas, e.g., $CO_2$ is removed from a gaseous stream by means of a process which comprises, in sequential steps, (1) contacting the gaseous stream with a solution comprising 10 to about 40 weight percent, preferably 20 to about 30 weight percent of potassium carbonate, an activator or promoter system comprising 2 to about 20 weight percent, preferably 5 to about 15 weight percent, more preferably 5 to about 10 weight percent of the sterically hindered aminoalkyl piperazine, as herein defined, and 2 to about 20 weight percent, preferably 5 to about 15 weight percent, more preferably 5 to about 10 weight percent, of the amino acid as herein defined, the balance of said solution being comprised of water, said contacting being conducted at conditions whereby the acid gas is absorbed in said solution, and preferably at a temperature ranging from 25° to about 200° C., more preferably from 35° to about 150° C. and a pressure ranging from 100 to about 1500 psig, and (2) regenerating said solution at conditions whereby said acid gas is desorbed from said solution. By practicing the present invention, one can operate the process above described at conditions whereby the working capacity, which is the difference in moles of acid gas absorbed in the solution at the termination of steps (1) and (2) based on the moles of potassium carbonate originally present, is greater than obtained under the same operating conditions for removing acid gases from gaseous streams, wherein said same operating conditions do not include an aminoalkyl piperazine as the promoter. In other words, working capacity is defined as follows:

$$\begin{pmatrix} CO_2 \text{ in solution} \\ \text{at completion of} \\ \text{absorption} \end{pmatrix} \text{ less } \begin{pmatrix} CO_2 \text{ in solution} \\ \text{at completion of} \\ \text{desorption} \end{pmatrix}$$

which is:

$$\frac{\text{Moles of } CO_2 \text{ Absorbed}}{\text{Initial Moles } K_2CO_3} \text{ less } \frac{\text{Moles Residual } CO_2 \text{ Absorbed}}{\text{Initial Moles } K_2CO_3}$$

It should be noted that throughout the specification wherein working capacity is referred to, the term is defined as the difference between $CO_2$ loading in solution at absorption conditions (step 1) and the $CO_2$ loading in solution at regeneration conditions (step 2) each divided by the initial moles of potassium carbonate. The working capacity is equivalent to the thermodynamic cyclic capacity, that is, the loading is measured at equilibrium conditions. This working capacity may be obtained from the vapor-liquid equilibrium isotherm, that is, from the relation between the $CO_2$ pressure in the gas and the acid gas, e.g., $CO_2$ loading in the solution at equilibrium at a given temperature. To calculate thermodynamic cyclic capacity, the following parameters must usually be specified: (1) acid gas, e.g., $CO_2$ absorption pressure, (2) acid gas, e.g., $CO_2$ regeneration pressure, (3) temperature of absorption, (4) temperature of regeneration, (5) solution composition, that is, weight percent of triamino piperazine and the weight percent of the alkaline salt or hydroxide, for example, potassium carbonate, and (6) gas composition. The skilled artisan may conveniently demonstrate the improved process which results on use of the sterically hindered amine by a comparison directly with a process wherein the sterically hindered amino compound is not included in the aqueous scrubbing solutions. For example, it will be found when comparing two similar acid gas scrubbing processes (that is similar gas composition, similar scrubbing solution composition, similar pressure and temperature conditions) that when the sterically hindered amines are utilized, the difference between the amount of acid gas, e.g., $CO_2$ absorbed at the end of step 1 (absorption step) defined above and step 2 (desorption step) defined above is significantly greater. This significantly increased working capacity is observed even though the scrubbing solution that is being compared comprises an equimolar amount of a prior art amine promoter, such as diethanolamine, 1,6-hexanediamine, etc. It has been found that the use of the aminoalkyl piperazine of the invention provides a working capacity which is at least 15% greater than the working capacity of a scrubbing solution which does not utilize the sterically hindered amine. Working capacity increases of from 20 to 60% may be obtained by use of the sterically hindered amino compound compared to diethanolamine.

Besides increasing working capacity and rates of absorption and desorption, the use of triamino piperazine leads to lower steam consumption during desorption.

Steam requirements are the major part of the energy cost of operating an acid gas, e.g., $CO_2$ scrubbing unit. Substantial reduction in energy, i.e., operating costs, will be obtained by the use of the process utilizing the triamino piperazine. Additional savings from new plant investment reduction and debottlenecking of existing plants may also be obtained by the use of the triamino piperazine. The removal of acid gases such as $CO_2$ from gas mixtures is of major industrial importance, particularly the systems which utilize potassium carbonate activated by the unique activator or promoter system of the present invention.

While the sterically hindered amines, as shown in U.S. Pat. No. 4,112,050, provides unique benefits in their ability to improve the working capacity in the acid scrubbing process, their efficiency decreases in alkaline "hot pot" (hot potassium carbonate) scrubbing systems at high temperatures and at low concentrations of the acid gas due to phase separation. Therefore, full advantage of these highly effective sterically hindered amines cannot always be utilized at these operating conditions. The addition of an amino acid, as a cosolvent and co-promoter as shown in U.S. Pat. No. 4,094,957, solves the problem of phase separation and enables a more complete utilization of sterically hindered amino compounds as the alkaline materials activator or promoter.

The absorbing solution of the present invention, as described above, will be comprised of a major proportion of two alkaline materials, e.g., alkali metal salts or hydroxides, and a minor proportion of the amino compound activator system. The remainder of the solution will be comprised of water and/or other commonly used additives, such as anti-foaming agents, antioxidants, corrosion inhibitors, etc. Examples of such additives include arsenious anhydride, selenious and tellurous acid, protides, vanadium oxides, e.g., $V_2O_3$, chromates, e.g., $K_2Cr_2O_7$, etc.

Representative N-aminoalkyl alkylpiperazines for use in the present invention include:

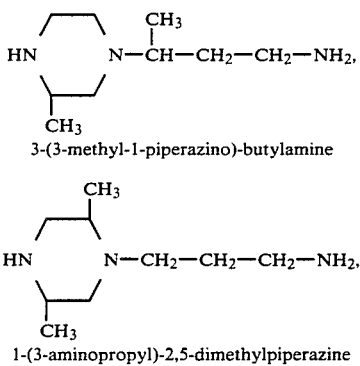

3-(3-methyl-1-piperazino)-butylamine 1-(3-aminopropyl)-2,5-dimethylpiperazine

Many of the amino acids useful in the practice of the present invention are either available commercially or may be prepared by various known procedures. Preferred amino acids are sterically hindered amino acids having 4 to 8 carbon atoms, e.g., N-isopropyl glycine, N-isopropyl alanine, N-sec. butyl glycine, N-sec. butyl alanine, N-n-butyl glycine, N-(2-pentyl)-glycine, and pipecolinic acid.

The invention is illustrated further by the following examples which, however, are not to be taken as limiting in any respect. All parts and percentages, unless expressly stated to be otherwise, are by weight.

EXAMPLE 1

One-Step Synthesis of 2,3-Dimethylpiperazine 360 g of ethylenediamine (6 moles) is put into a 3-liter beaker, diluted to 1.8 liters with methanol, cooled to 31 10° C. and charged into a 1-gal autoclave. 200 g of Raney Ni, washed with 200 ml of 1N KOH in methanol, is added. While stirring manually under a blanket of nitrogen, 516 g of biacetyl is added (6 moles). The biacetyl was freshly distilled and cooled to $-10°$ C. After the addition is complete, the autoclave is closed and pressurized to 1000 psi with hydrogen, while increasing the temperature from 40° to 80° C. in the course of 2 hours. On the following day the autoclave is opened and the product is filtered.

The reaction is repeated, this time adding the biacetyl after the autoclave has been closed. Otherwise the same conditions are used.

The two filtrates are combined and distilled through a 30-cm column at atmospheric pressure. 873 g of 2,3-dimethylpiperazine is obtained, b.p. 167°–168° C., yield 63.8%.

EXAMPLE 2

Synthesis of 1-Aminoethyl-2,3-dimethylpiperazine by Cyanomethylation of 2,3-Dimethylpiperazine The reaction apparatus is a 1-liter, 3-neck flask, equipped with reflux condenser, thermometer and dropping funnel. 327 g (2.87 moles) of 2,3-dimethylpiperazine, 150 ml of water and 150 ml of ethanol are put into the flask. The solution is brought to reflux and 117 g of 70% glycolo nitrile (1.43 moles) is added in the course of 70 minutes. The temperature increases from 83° to 91° C. The mixture is refluxed for 3 hours. Water and ethanol are removed by distillation up to a temperature of 86° C. (pot temperature 104° C.). The pressure is reduced slowly to 0.15 mm Hg.

After unreacted dimethylpiperazine, the product distills at 95°–115° C./0.5 mm Hg. The weight is 116 g.

Found: C=61.6%; H=10.14%; N=26.6%; Calc. C=62.7%; H=9.8%; N=27.5%.

153 g of N-cyanomethyl-2,3-dimethylpiperazine (1 mole) is dissolved in 400 ml of ethanol. 50 g of Raney Ni and a scoop of activated charcoal (Nuchar) are added. The mixture is brought to 45° C. and kept there for 15 minutes, and then filtered. The filtrate is put into a 1-gal autoclave. 21 g of 10% Pd on C, wet with ethanol saturated with $NH_3$, is added under a nitrogen blanket. Then 1.5 liters of ethanol saturated with $NH_3$ is added. Hydrogenation is carried out at 1200 psi and 55° C. After cooling, the reaction mixture is filtered through a precoated funnel. Ethanol is removed through a 30-cm column. 58 g of a cut boiling between 80° and 105° C. at 1.5 mm Hg is collected. Redistillation gives 48 g of product boiling at 81°–82° C./0.3 mm Hg.

Found C=60.8%; H=12.33%; N=26.6%; Calc. C=61.1%; H=12.18%; N=26.7%.

EXAMPLE 3

Synthesis of 1-Aminoethyl-2,3-dimethylpiperazine from Biacetyl and Diethylenetriamine The reaction apparatus is a 5-liter, 3-neck, round-bottom flask, equipped with stirrer, reflux condenser, thermometer and dropping funnel. 2 liters of diethyl ether and 206 g (2 moles) of freshly distilled diethylenetriamine are added. The solution is cooled with ice-water and 172 g (2 moles) of biacetyl is slowly added. The mixture is stirred overnight, then refluxed for 6 hours. Most of the ether is removed by distillation and replaced with benzene. A Dean-Stark trap is inserted and 71 ml of $H_2O$ is collected in it. After removing most benzene in vacuo, a product is collected at 87° C./0.1 mm Hg to 92° C./0.5 mm Hg. The weight is 278 g. This distillate is dissolved in 1.5 liters of methanol and put into a 1-gal autoclave. 125 g of Raney Ni, previously washed with two 200-ml portions of methanol and 200 ml of 1N KOH in methanol is added. Hydrogenation is carried out at 1000 psi and 100° C. during 2.5 hours. After cooling and filtration, ethanol is removed in vacuo. 1-aminoethyl-2,3-dimethyl piperazine is collected at 84° C./0.2 mm Hg. The weight is 250 g (79% yield).

Found C=60.5; H=12.11%; N=26.2%; Calc. C=61.1%; H=12.18%; N=26.7%.

The IR spectrum of this product is identical to that of the product obtained in Example 2.

EXAMPLE 4

Synthesis of 3-(3-methyl-1-piperazino)-butylamine

In a 2-l Erlenmeyer flask, 500 g of 2-methylpiperazine (4.7 moles) is dissolved in 500 ml of water. 315 g of allyl cyanide (4.7 moles) is added.

The mixture soon becomes homogeneous and reaches a peak temperature of 64° C.

This procedure is repeated the next day. The two batches are combined. After removing $H_2O$ and low boilers by distillation at reduced pressure, 1359 g of a cut boiling at 116°–117° C./0.3 mm is obtained. Yield is 86%.

This product is charged into a 1-gallon autoclave, together with 300 ml of methanol, 15 g of KOH dissolved in methanol and 150 g of Raney Ni.

Hydrogenation is carried out at room temperature and 850–1700 psi in 2.5 hours.

At the end the autoclave is opened, the catalyst is separated by filtration and the filtrate is distilled under reduced pressure. 742 g of product boiling at 137° C./20 mm Hg is obtained.

Found C=62.4%; H=12.07%; N=23.3%; Calc. C=63.1%; H=12.30%; N=24.6%.

EXAMPLE 5

Preparation of 1-(3-aminopropyl)-2,5-dimethylpiperazine (APDP)

300 g of isopropanolamine (4 moles), 600 ml t-butyl alcohol and 20 g wet Raney Ni are charged into a 1 gallon autoclave. Hydrogen was introduced to a pressure of 400 psi, then the temperature was increased and maintained between 166–180 for four hours. The catalyst was separated by filtration and the product distilled through a 30 cm column to a pot temperature of 168° C. The condenser was kept at 150° C. The condensate quickly solidified and gave 202.4 g of 2,5-dimethylpiperazine. An additional 6 g was obtained by boiling out the column with ether. Total yield, 91%.

228 g of 2,5-dimethylpiperazine (2 moles), 116.6 g of acrylonitrile and 750 ml of t-butyl alcohol were refluxed for 48 hours (8 hours is sufficient). The cooled product, a slurry, was charged into 90 gallon autoclave with 250 ml of t-butyl alcohol, 75 g Raney Ni (washed with ethanol, then with t-butyl alcohol) and 20 g of 50% KOH.

Hydrogen was introduced to a pressure of 1100 psi. The temperature rose spontaneously to 42° C. A pressure drop corresponding to 610 psi was observed. The autoclave was opened, the catalyst separated by filtration, and the filtrate neutralized with 50 ml of 6N HCl. The product was distilled through a 30 cm column to a pot temperature of 170° C. 195.4 g of 1-(3-aminopropyl)-2,5-dimethylpiperazine, boiling at 132°–136° C./17 mm Hg, was collected. The yield was 57%.

The above procedure can be combined in a one pot synthesis provided the $H_2O$ generated by the formation of the 2,5-dimethylpiperazine is removed. One method to accomplish this is the use of selective drying agents which will not interact strongly with the tertiary alcohol.

Other tertiary alcohols are suitable solvents for this invention as are ethers such as tetrahydrofuran; however, tertiary butyl alcohol is preferred.

EXAMPLE 6

Use of 1-(3-aminopropyl)-2,5-dimethylpiperazine (APDP) as an activator for $K_2CO_3$ in $CO_2$ Removal The reaction apparatus consists of an absorber and a desorber as shown in FIG. 1 of U.S. Pat. No. 4,112,050. The absorber is a vessel having a capacity of 2.5 liters and a diameter of 10 cm, equipped with a heating jacket and a stirrer. A pump removes liquid from the bottom of the reactor and feeds it back to above the liquid level through a stainless-steel sparger. Nitrogen and $CO_2$ can be fed to the bottom of the cell through a sparger.

The desorber is a 1-liter reactor, equipped with teflon blade stirrer, gas sparger, reflux condenser and thermometer.

The following reagents were charged into a two-liter flask:

60.3 g 1-(3-aminopropyl)-2,5-dimethyl piperazine (APDP)
22.5 g Pipecolinic acid (PA)
225 g $K_2CO_3$
442.5 g $H_2O$ When all the solid had dissolved, the mixture was placed in the absorber and brought to 80° C. The apparatus was closed and evacuated until the liquid began to boil. The $CO_2$ was admitted until the solution was saturated.

The rich solution so obtained was transferred to the desorber and boiled for one hour during which $CO_2$ was desorbed. The regenerated solution was placed back in the absorber and brought to 80° C. The apparatus was evacuated until the liquid began to boil. Then $CO_2$ was admitted and the rate of absorption and the total capacity were measured. The result is presented in the table below.

The experiment was repeated substituting secondary butylglycine (SBG) for PA. The experiment was repeated using equimolar quantities of some methylpiperazines. The results of these tests are shown in Table I.

TABLE I

$CO_2$ SCRUBBINB BY TRIAMINO PIPERAZINE PROMOTED $K_2CO_3$ SOLUTIONS

| Amine | Amino Acid | Capacity (Liters) | Time (Min:Sec) to Absorb: 10 Liters | 15 Liters | 20 Liters |
|---|---|---|---|---|---|
| $N(CH_2)_3NH_2$ | PA[1] | 30.5 | 0:59 | 1:35 | 2:35 |
| $N(CH_2)_3NH_2$ | SBG[2] | 30.8 | 0:45 | 1:23 | 2:18 |
| $N(CH_2)_3NH_2$ (comparative) | PA[1] | 27.8 | 0:59 | 1:46 | 2:55 |
| $CH_3N\ N(CH_2)_3NH_2$ (comparative) | PA[1] | 26.0 | 1:40 | 2:48 | 4:23 |

[1]PA is pipecolinic acid
[2]SBG is N—sec. butylglycine

The results in Table I show that 1-(3-aminopropyl)-2,5-dimethyl piperazine (APDP) in combination with amino acid is more effective as a promoter for hot carbonate scrubbing than related piperazines in terms of capacity and rates of absorption.

EXAMPLE 7

Stability

Scrubbing solutions containing 1-(3-aminopropyl)-2,5-dimethylpiperazine (APDP) were subjected to severe aging experiments at 120° C. and 1000 hours under $CO_2$ in sealed steel bombs. The solutions were desorbed and retested in the batch absorber.

A mixture of 80.4 g APDP, 31 g PA, 24 g $K_2S$, 391 g $KHCO_3$, and 554 g $H_2O$ was heated at 120° C. for 1000 hours. The solution refluxed and a 765 g sample absorbed, desorbed, and reabsorbed $CO_2$.

The experiment was repeated without sulfur being present.

TABLE II

1,000 Hour (120° C.) Aging Experiment

| Amine | Amino Acid | Sulfur | Capacity (Liters) | Time (Min:Sec) to Reabsorb: 10 Liters | 15 Liters | 20 Liters |
|---|---|---|---|---|---|---|
| APDP[1] | PA[2] | Present | 29.7 | 1:02 | 1:45 | 2:45 |
| APDP | PA | None | 27.2 | 1:10 | 2:07 | 3:40 |
| APDP | SBG[3] | Present | 28.5 | 1:02 | 1:52 | 3:10 |
| APDP | SBG | None | 28.2 | 1:04 | 1:52 | 3:02 |

[1]APDP is 1-(3-aminopropyl)-2,5-dimethylpiperazine
[2]PA is pipecolinic acid
[3]SBG is N—sec. butylglycine Table II shows that APDP is stable and sulfur tolerant.

EXAMPLE 8

Use of 3-(3-methyl-1-piperazine)-butylamine as an Activator for $K_2CO_3$ in $CO_2$ Removal The apparatus consists of an absorber and a desorber. The absorber is a vessel having a capacity of 2.5 liters and a diameter of 10 cm, equipped with heating jacket, stirrer, thermometer and reflux condenser. A pump removes the liquid from the bottom of the reactor and feeds it back above the liquid through a stainless-steel sparger. The top of the reflux condenser is connected to a U-shaped, open-ended manometer. The apparatus can be evacuated by means of a pump. Nitrogen and $CO_2$ can be fed to the bottom of the cell through a sparger. $CO_2$, coming from a cylinder, goes first to a 60-liter tank, acting as a ballast, then to a 3-liter wet-test meter. A recorder is connected to the wet-test meter to give the liters of $CO_2$ absorbed as a function of time.

The desorber is a 1-liter reactor, equipped with stirrer, gas sparger, reflux condenser and thermometer. Volumes of gases entering and exiting the desorber can be read on a recorder connected to wet-test meters inserted in the desorber inlet and outlet lines.

The following mixture is prepared and put into the absorber:
60.3 g of 3-(3-methyl-1-piperazino)-butylamine
33.7 g of pipecolinic acid
225 g of $K_2CO_3$
431 g of $H_2O$ The temperature is brought to 80° C. The apparatus is evacuated until the liquid begins to boil. The pump for the circulation of the liquid is regulated at 4 liters/minute. $CO_2$ is admitted to the absorber. The total amount of $CO_2$ absorbed is 42 liters.

The rich solution so obtained is transferred to the desorber and kept there for one hour from the time it begins to boil. 31.3 liters of $CO_2$ is desorbed. No foam is observed in the desorber.

The regenerated solution is cooled, then put back into the absorber. The same operations as described for the initial absorption are carried out. 32.8 liters of $CO_2$ is absorbed, of which 11 liters is absorbed in the first minute.

The rich solution so obtained is regenerated by refluxing it for 1 hour, then put into a 1-liter autoclave equipped with a sapphire window. The solution is brought to 120° C. while blowing through it a gaseous mixture containing 0.2% $CO_2$ and 99.8% of He. When equilibrium is reached, i.e. when the outgoing gas has the same composition as the entering gas, only one phase is present.

EXAMPLE 9

Volatility Experiment

The solution used in this experiment is similar to that used in the absorption-desorption test of Example 8, the only difference being that the pipecolinic acid is 3.05%.

The apparatus is a 1-liter flask, equipped with thermometer, magnetic bar, inlet tube for gases and a Dean-Stark trap surmounted by a reflux condenser.

600 g of solution is put into the flask and refluxed, while blowing through it a 0.2%/99.8% $CO_2$/He mixture at a rate of 0.25 liters/minute.

After one hour at reflux the content of the Dean-Stark trap is put back into the flask; then a fresh sample of condensate is taken.

Another sample is taken after a second hour at reflux. The two samples show an amine content of about 0.11%.

If the experiment is repeated, using N-cyclohexyl-1,3-propanediamine instead of methylpiperazinobutylamine, the condensate contains 1.3% of amine, i.e. the volatility of the triamine is about 1/10 of the volatility of cyclohexyl-propanediamine.

EXAMPLE 10

Aging Experiment

The following compounds are charged into a 2-liter stainless-steel bomb:
80.4 g of 3-(3-methyl-1-piperazino)-butylamine
45 g of pipecolinic acid
435 g of $KHCO_3$ 534.5 g of H$_2$O The bomb is put into an oven and kept at 120° C. for 1000 hours.

Then the product is discharged into a 2-liter flask and refluxed for several hours.

765 g of solution is used in an absorption-desorption cycle as described in Example 8.

29.5 liters of CO$_2$ is reabsorbed, of which 8 is reabsorbed in the first minute. Comparing with the result of Example 8, it is clear that the aged solution is only slightly inferior to the fresh solution.

What is claimed is:

1. A process for the removal of CO$_2$ from a gaseous stream containing CO$_2$ which comprises contacting said gaseous stream (1) in an absorption step with an aqueous absorbing solution comprising (a) a basic alkali metal salt of hydroxide selected from alkali metal bicarbonates, carbonates, hydroxides, borates, phosphates and their mixtures, and (b) an activator or promoter system for said basic alkali metal salt or hydroxide comprising an N-aminoalkyl alkylpiperazine; and (2) in a desorption and regeneration step, desorbing at least a portion of the absorbed CO$_2$ from said absorbing solution.

2. The process of claim 1 wherein the basic alkali metal salt is potassium carbonate.

3. The process of claim 1 wherein the aqueous solution contains 10 to 40% by weight of said basic alkali metal salt or hydroxide.

4. The process of claim 1 wherein the aqueous solution contains 2 to 20% by weight of said N-aminoalkyl alkylpiperazine.

5. The process of claim 4 wherein the aqueous solution contains 5 to 15% by weight of said N-aminoalkyl alkylpiperazine.

6. A process of claim 1 wherein the absorbing solution from the regenerating step is recycled for reuse in the absorption step.

7. A process of claim 1 wherein the absorbing solution additionally includes an amino acid.

8. The process of claim 7 wherein the amino acid contains 4 to 8 carbon atoms per molecule.

9. The process of claim 7 wherein the absorbing solution contains 2 to 20% by weight of the amino acid.

10. The process of claim 1 wherein the absorbing solution additionally includes additives selected from antifoaming agents, antioxidants and corrosion inhibitors.

11. The process of claim 1 wherein the contacting is conducted at conditions whereby CO$_2$ is absorbed in said absorbing solution, the temperature of the absorbing solution during the absorption step ranging from 25° to 200° C. and the pressure in the absorber ranging from 5 to 2000 psia, and said absorbing solution is regenerated at conditions whereby CO$_2$ is desorbed from said absorbing solution, the temperature of the absorbing solution during the regeneration step ranging from 25° to 200° C. and the pressure ranging from 5 to 100 psia.

12. The process of claim 11 wherein the temperature of the absorbing solution during the absorption step is in the range of from 35° to 150° C. and the pressure in the absorber is in the range of from 100 to 1500 psig; and the regeneration takes place at a temperature ranging from 35° to 150° C. and at a pressure ranging from 16 to 100 psig.

13. The process of claim 11 wherein the partial pressure of the acid gas components in the feed stream ranges from 0.1 to 500 psia.

14. An aqueous acid gas scrubbing composition comprising: (a) 10 to about 40% by weight of an alkali metal salt or hydroxide, (b) 2 to about 20% by weight of "either 1-(3-aminopropyl)-2,5-dimethyl-piperazine (APDP) or 3-(3-methyl-1-piperazino)-butylamine," and (c) the balance, water.

15. The composition of claim 14 wherein said alkali metal salt is potassium carbonate.

16. The composition of claim 15 comprising: (a) 20 to 30% by weight of potassium carbonate, (b) 5 to about 15% by weight of 1-(3-aminopropyl)-2,5-dimethylpiperazine and (c) the balance, water.

17. The composition of claim 14 which additionally contains 2 to 20% by weight of an amino acid having 4 to 8 carbon atoms per molecule.

18. The composition of claim 17 wherein the amino cis is N-secondary butyl glycine.

* * * * *